United States Patent [19]

Masuda et al.

[11] 4,428,399

[45] Jan. 31, 1984

[54] POWER STEERING APPARATUS

[75] Inventors: Naosuke Masuda; Yoshio Tobisawa; Tadaaki Fujii, all of Higashimatsuyama, Japan

[73] Assignee: Jidosha Kiki Co., Ltd., Tokyo, Japan

[21] Appl. No.: 284,144

[22] Filed: Jul. 16, 1981

[30] Foreign Application Priority Data

Sep. 17, 1980 [JP] Japan .................................. 55-128701
Mar. 13, 1981 [JP] Japan .................................. 56-36042

[51] Int. Cl.$^3$ .............................................. F15B 9/00
[52] U.S. Cl. ............................ 137/625.22; 91/375 A; 91/375 R
[58] Field of Search ............................ 464/77, 78, 79; 137/625.21, 625.22, 625.23; 91/375 R, 375 A

[56] References Cited

U.S. PATENT DOCUMENTS

| | | | |
|---|---|---|---|
| 2,263,113 | 11/1941 | Wichorek | 464/77 |
| 2,484,321 | 10/1949 | Stubau | 464/77 UX |
| 3,145,626 | 8/1964 | Vickers | 91/375 A |
| 3,162,263 | 12/1964 | Brown | 91/375 A X |
| 3,273,465 | 9/1966 | Eddy | 91/375 A |

*Primary Examiner*—Alan Cohan
*Attorney, Agent, or Firm*—Flynn, Thiel, Boutell & Tanis

[57] ABSTRACT

A power steering apparatus is provided including a control valve or rotary type which controls the supply to or discharge from a power cylinder of a hydraulic fluid. A valve rotor is integrally formed with a projection within the region of a valve sleeve, which is formed with an opening therein to permit the free end of the projection to extend therethrough to the exterior thereof, with the projection being disposed in the opening to leave a given spacing therebetween, as viewed in the direction of rotation of the valve sleeve. Another projection is integrally provided on the valve sleeve, and the both projections are maintained at given positions by the resilience of a spring which is disposed in surrounding relationship with the valve sleeve. As a result, the both projections are provided at axially close locations and in a region where an input and an output shaft abut against each other. This arrangement is preferred in consideration of the mechanical strength. Since the spring is disposed in surrounding relationship with the valve sleeve, the involved construction may be made compact while assuring a resilience of a sufficient magnitude. The C-shaped spring is configured in a manner such that stresses produced therein remain to be uniform throughout the entire body thereof. This allows the spring and hence its mounting structure to be reduced in size.

14 Claims, 4 Drawing Figures

POWER STEERING APPARATUS

BACKGROUND OF THE INVENTION

The invention relates to a power steering apparatus, in particular, to a power steering apparatus including a control valve of the rotary type which controls the supply to or discharge from a power cylinder of a hydraulic fluid.

A control valve of the rotary type is formed, for example, of a valve rotor which is integrally formed on an input shaft which is disposed on the steering wheel side, and a valve sleeve which is integrally formed on an output shaft adapted to be connected to the steerable road wheel and rotatable around the outer periphery of the valve rotor. In operation, the valve controls the direction of flow of hydraulic fluid to or from the power cylinder in accordance with the direction of a relative angular displacement, from a neutral position, between the input and the output shaft or between the valve rotor and the valve sleeve. The usual practice has been to provide a torsion bar interposed between the input and the output shafts to connect them together so that both the valve rotor and the valve sleeve can be maintained in their neutral position by the resilience of the torsion bar whenever the valve is non-operative. However, the neutral position of the valve rotor and the sleeve must be established when the torsional stress in the torsion bar remains zero in either direction. This makes it impossible to apply a bias load or preload across the input and the output shaft by utilizing the torsion bar.

To overcome this difficulty, there is proposed a power steering apparatus including a substantially C-shaped spring formed of a ring-shaped spring material a part of which is removed to define a notch, in addition to or in place of the torsion bar so that projections integral with the input and the output shafts are simultaneously held between the end faces which define the notch in the C-shaped spring with a given magnitude of resilience, thus allowing both shafts to be maintained in their neutral position while allowing them to be simultaneously preloaded. However, when such a C-shaped spring is used in a power steering apparatus including a control valve of the rotary type, there results an increased complexity and size in the location where the C-shaped spring is contained inside a valve sleeve integral with the output shaft, inasmuch as it is generally desirable that the projections be formed adjacent to the abutting ends of the input and the output shafts due to considerations of strength, and that the valve sleeve internally receive the input shaft and the valve rotor therein.

In addition, the abutment of the end faces which define the notch in the C-shaped spring against the projections from the input and output shafts in order to maintain them in their neutral position requires a generally increased size of the spring itself if the spring has a uniform thickness throughout its circumference as in the prior art. This is because the value of the thickness must be determined in consideration of the magnitude of the bending moment which results because of the reaction from the projections, which reaches its maximum at the central portion, that is, the region of the spring located diametrically opposite to the notch formed therein. Thus, the stress in a region remote from the central portion is reduced, which means that the thickness of such a region is not effectively utilized. In other words, the configuration of the C-shaped spring also contributes to the increased size of the arrangement around the valve sleeve.

SUMMARY OF THE INVENTION

Therefore, it is an object of the invention to provide a power steering apparatus which has a reduced size and which employs a simplified arrangement for mounting a C-shaped spring. This object is achieved by forming a projection integral with a valve rotor in a region within a valve sleeve and having its free end extending through an opening formed in the sleeve to project externally. A given clearance is defined between the projection and the opening, as viewed in the direction of rotation of the valve sleeve. Another projection is formed integrally with the valve sleeve, and both projections are maintained at given positions by the resilience of a spring which is disposed in surrounding relationship with the valve sleeve.

It is another object of the invention to provide a power steering apparatus including a compact C-shaped spring exhibiting an excellent strength performance and which has a configuration such that the stresses produced therein remain uniform throughout the entire region thereof.

Other objects and advantages of the invention will become apparent from the following detailed description with reference to the attached drawings.

DESCRIPTION OF PREFERRED EMBODIMENT

Figure 1:
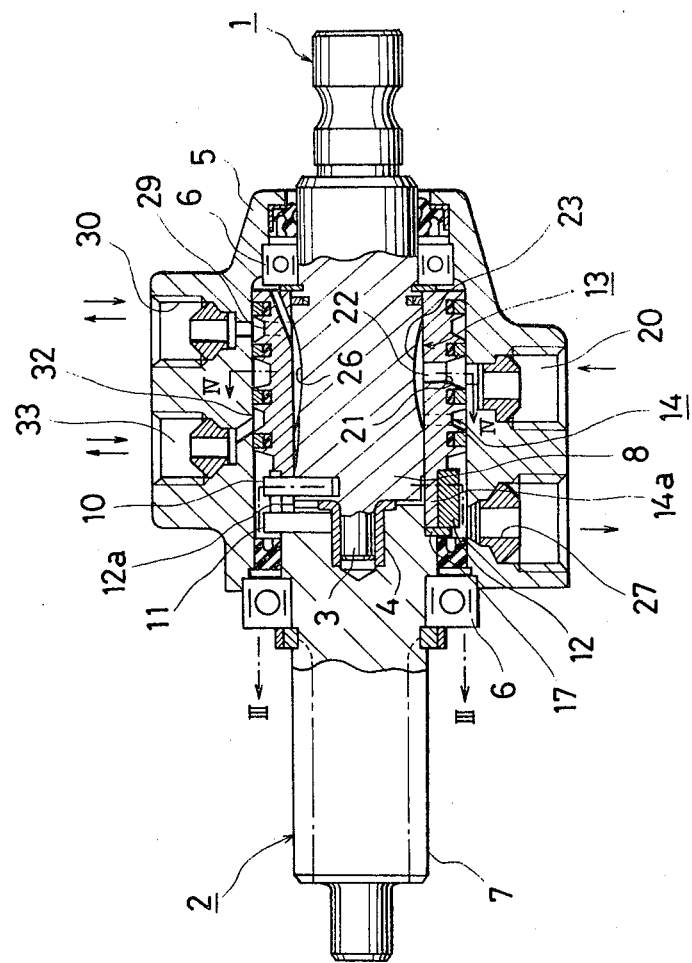
FIG. 1 is a longitudinal section of one embodiment of the invention.

Referring to FIG. 1, there is shown one embodiment of the invention including an input shaft 1 and an output shaft 2 which are disposed in coaxial relationship. A shank 3 extends from the inner end of the input shaft 1 and is rotatably disposed in a bushing 4 which is fitted into the inner end of the output shaft 2. The resulting assembly is rotatably journaled within a housing 5 by means of bearings 6. The input shaft 1 is connected to a steering wheel, not shown, while the remainder of the output shaft 2 is formed with a helical pinion 7 which meshes with a steerable road wheel, not shown, in the same manner as in a conventional power steering apparatus of the rack and pinion type.

Figure 2:
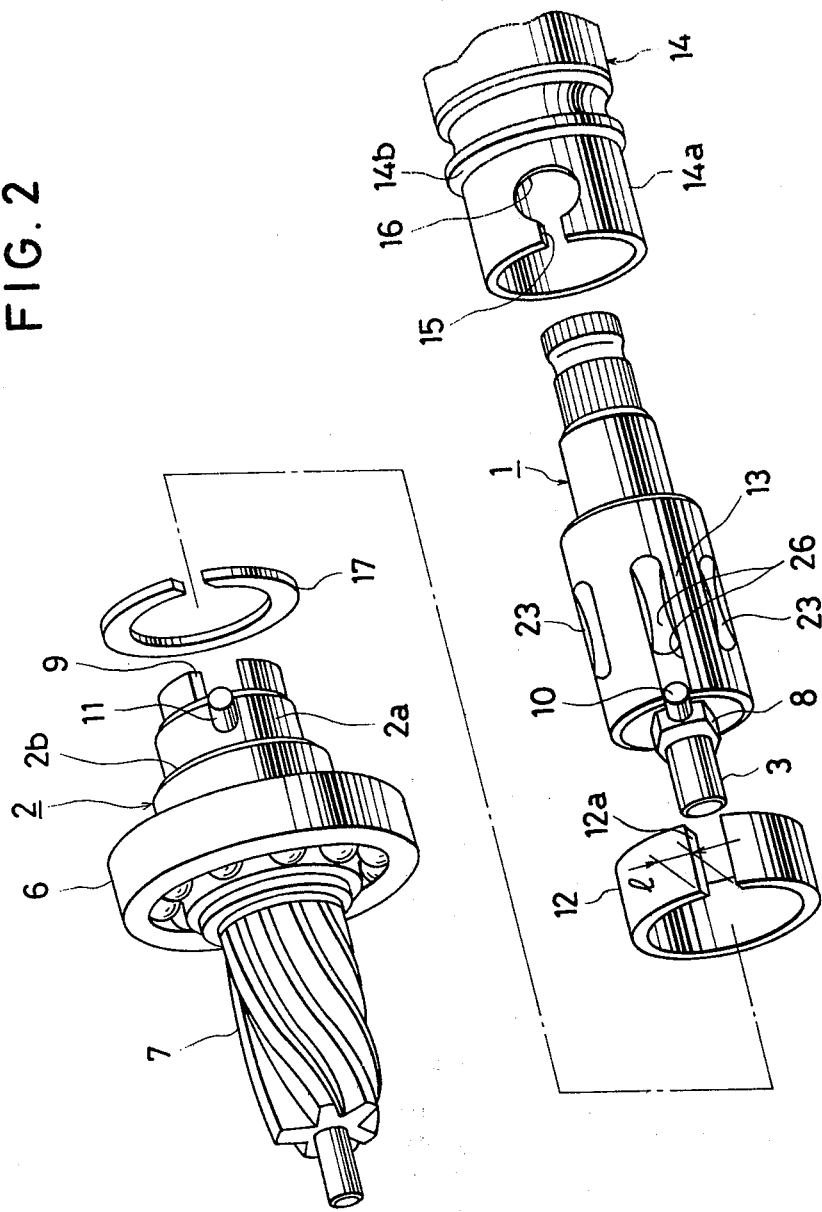
FIG. 2 is an exploded perspective view of essential parts of FIG. 1.
Figure 3:
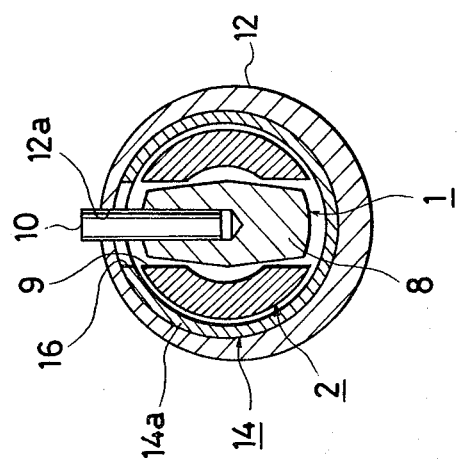

Adjacent to its inner end, the input shaft 1 is formed with a substantially rectangular section 8 which is located on the outside of the shank 3 and which is disposed in a groove 9 formed in the output shaft 2 with a given circumferential clearance therebetween. In this manner, a relative rotation is permitted between the input shaft 1 and the output shaft 2 as determined by the magnitude of the clearance. Projections 10, 11 are formed on the input and the output shafts 1, 2, respectively, adjacent to the rectangular section 8 and the groove 9, respectively, and extend radially. A C-shaped spring 12 is disposed in surrounding relationship with the rectangular section 8 and the groove 9 and has a notch 12a formed therein, the end faces of which hold both projections 10, 11 therebetween. As shown in FIG. 3, the spring 12 has a minimum thickness in the region of the notch 12a, and its thickness gradually increases toward a point which is diametrically opposite to the notch 12a so that the stresses which are produced in the spring 12 in response to forces exerted by the projections 10, 11 remain uniform throughout the body of the spring. The circumferential gap length 1 of the notch 12a (see FIG. 2) of the spring 12 in a relaxed condition thereof is less than the diameter of the projections 10, 11. Hence, when the projections 10, 11 are held between the end faces of the notch 12a, the input and the output shafts 1, 2 can be preloaded as desired. It should be understood that when no external force is applied to the shafts, the rectangular section 8 is maintained in its neutral position as viewed in the direction of rotation of the groove 9, by the action of the spring 12.

Directly formed on the input shaft 1 is a valve rotor 13, over which a valve sleeve 14 is rotatably fitted, thus forming a control valve of the rotary type which is basically known in the art. It is necessary that the valve sleeve 14 be integrally connected to the output shaft 2. In the prior art practice, the valve sleeve 14 has been connected to the output shaft 2 in a manner surrounding the projections 10, 11 and the C-shaped spring 12, as mentioned previously. However, in the present embodiment, it is connected to the output shaft 2 inside the spring 12. Specifically, referring to FIG. 2, it will be noted that the end of the valve sleeve 14 disposed adjacent to the output shaft 2 is formed as a cylindrical portion 14a which can be fitted over a portion 2a of the output shaft 2 where the projection 11 is formed. The cylindrical portion 14a is formed with an axially extending groove 15 having a width which is equal to the circumferential dimension or width of the projection 11, and also formed with a slot 16 which permits the projection 10 to extend therethrough and also permits circumferential displacement thereof. As will be noted from FIGS. 1 and 3, the cylindrical portion 14a is disposed inside the spring 12, with the groove 15 engaged with the projection 11 to provide an integral connection between the output shaft 2 and the valve sleeve 14, as viewed in the direction of rotation thereof. The projection 10 loosely extends through the slot 16 with a given clearance on both sides thereof. It will be noted that the spring 12 is held between a spacer 17 disposed against a step 2b in the output shaft 2 and a step 14b formed in the valve sleeve 14.

Figure 4:
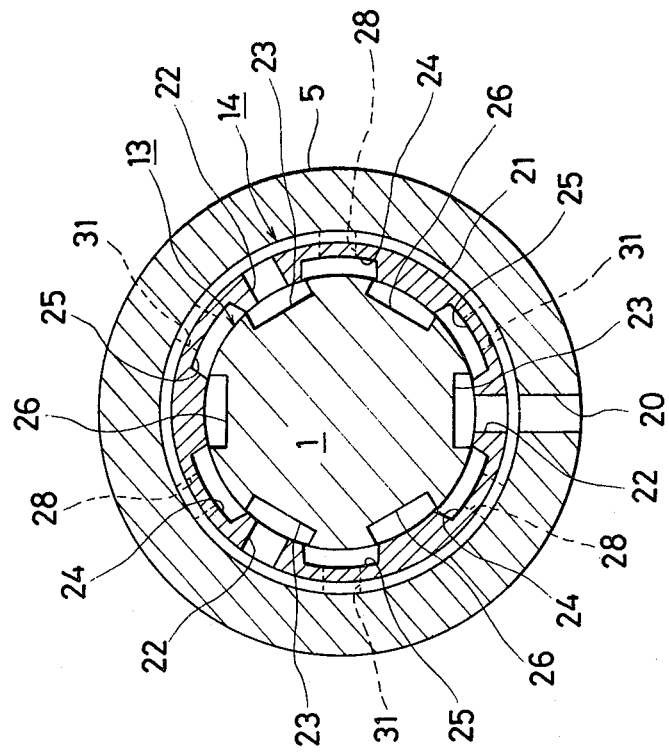
FIGS. 3 and 4 are cross sections taken along the lines III—III and IV—IV shown in FIG. 1, respectively.

The control valve which is formed by the valve rotor 13 and the valve sleeve 14 operates to provide circulation of hydraulic fluid from a pump, not shown, when it is in its neutral condition. Specifically, referring to FIG. 4 together with FIG. 1, it will be seen that the hydraulic fluid from the pump flows through a supply opening 20 formed in the housing 5, an annular groove 21 and three radial passages 22 formed in the valve sleeve 14 at positions 120 degrees apart into three axial supply flutes 23 formed in the valve rotor 13 at positions 120 degrees apart, and thence through axial flutes 24, 25 formed in the inner surface of the valve sleeve 14, so as to be capable of overlapping with the circumferential ends of the flutes 23. The fluid then flows into three axial discharge flutes 26 set at positions 120 degrees apart and formed in the valve rotor 13 so that each is capable of overlapping the corresponding adjacent flutes 24, 25. The hydraulic fluid which finds its way into the discharge grooves 26 flows therealong to the region where the input shaft 1 and the output shaft 2 abut against each other, and thence through the slot 16 and the notch 12a in the spring 12 to the outside of the valve sleeve 14 to be finally returned to the suction side of the pump through a discharge opening 27 formed in the housing 5. The flutes 24, each communicating with one side of the corresponding supply flute 23, also communicate with one of the chambers defined in a power cylinder, not shown, through three radial passages 28, set at positions 120 degrees apart, an annular flute 29 and a supply and discharge opening 30 formed in the housing 5, while the flute 25 communicating with the other side of the corresponding flute 23, also communicate with the other chamber of the power cylinder through three radial passages 31 set at positions 120 degrees apart, an annular flute 32 and a supply and discharge opening 33. At neutral position, the areas of the flow paths formed between the supply flutes 23 on one side and the corresponding flutes 24, 25 located on the opposite sides thereof are substantially equal to each other, and hence there is no pressure differential between the flutes 24, 25, thus maintaining the power cylinder in its non-operative condition.

However, when the input shaft 1 is angularly driven in one direction, a relative rotation occurs between the projections 10, 11 and hence between the valve rotor 13 and the valve sleeve 14 against the resilience of the C-shaped spring 12, with a consequent difference in the area of flow paths between each of the suply flutes 23 and the corresponding flutes 24, 25 located on the opposite sides thereof, depending on the direction of angular movement of the input shaft 1. Accordingly, a pressure differential is created between the flutes 24 and the flutes 25 that actuates the power cylinder, thus supplying an assisting drive in the steering direction, as is well known in the art.

The C-shaped spring 12 functions in a similar manner as in the prior art, but it has a maximum thickness in a region diametrically opposite to the notch formed therein and has a gradually decreasing thickness toward the end faces which define the notch. As a result of such construction, it presents an effective resistance to a bending moment while maintaining a required spring constant. In addition, the entire spring is constructed with a reduced weight and in a small size. Accordingly, the spring 12 can be utilized in a conventional arrangement in which a C-shaped spring is disposed within a valve sleeve thereby reducing the diametrical dimension of the device.

While the invention has been specifically described with reference to a particular embodiment thereof shown in the drawings, it should be understood that various changes, modifications and substitutions will readily occur to one skilled in the art without departing from the spirit and scope of the invention. Therefore, it is intended that the scope of the invention be solely limited by the appended claims.

What is claimed is:

1. A power steering apparatus including an input shaft adapted to be connected to a steering wheel, an output shaft disposed in coaxial relationship with the input shaft and adapted to be connected to a steerable road wheel, and a control valve including a pair of control valve elements connected for integral rotation with the input shaft and the output shaft, respectively, for controlling the supply to or discharge from a power cylinder of a hydraulic fluid in accordance with a relative angular displacement between the pair of control valve elements, wherein the improvement comprises: a substantially C-shaped spring in the form of a cylinder having a longitudinal split therein defining a gap, the radial thickness of said spring increasing gradually from said gap to a point diametrically opposite said gap, mating portions formed on said input shaft and said output shaft, respectively, for integral rotation therewith, said mating portions being engageable with said substantially C-shaped spring so that the end faces of said gap are disposed on opposite sides of said mating portions, whereby the resilience of said spring maintains said mating portions in given positions.

2. A power steering apparatus according to claim 1 in which said control valve elements comprise a valve rotor and a valve sleeve rotatably fitted around the valve rotor.

3. A power steering apparatus according to claim 1 in which said spring is subject to circumferential flexure in accordance with a relative angular displacement between said input shaft and said output shaft.

4. A power steering apparatus according to claim 1 or claim 2 in which said spring is disposed in surrounding relationship with said input shaft and said output shaft at the mutually adjacent ends of said shafts.

5. A power steering apparatus according to claim 1 or claim 2 in which one of said mating portions is integrally formed on said input shaft while the other of said mating portions is integrally formed on the output shaft or the control valve element associated therewith.

6. A power steering apparatus according to claim 1 or claim 2 in which one of said mating portions is integrally formed on the control valve element which is mounted on said input shaft while the other of said mating portions is integrally formed on said output shaft.

7. A power steering apparatus according to claim 5 in which each of said mating portions is a projection extending radially outwardly from its associated shaft.

8. A power steering apparatus according to claim 6 in which each of said mating portions is a projection extending radially outwardly from its associated shaft.

9. A power steering apparatus, comprising: an input shaft adapted to be connected to a steering wheel; an output shaft disposed in coaxial relationship with said input shaft and adapted to effect steering movement of steerable road wheels, said output shaft being mounted for relative angular dislacement with respect to said input shaft; a control valve comprising a valve sleeve connected for rotation in unison with said output shaft and a valve rotor connected for rotation in unison with said input shaft, said valve rotor being disposed within said valve sleeve for relative angular displacement with respect thereto so that relative angular displacement of said input and output shafts effects relative angular displacement of said valve rotor and said valve sleeve whereby to control the supply to or discharge from a power cylinder of a hydraulic fluid, a first projection extending outwardly from said valve rotor and connected for rotation in unison therewith, said valve sleeve having an opening therethrough, said first projection extending through said opening to a location outside of said valve sleeve, the width of said opening in said valve sleeve in the direction of rotation of said valve sleeve being larger than the corresponding width of said first projection whereby to provide a clearance therebetween to permit limited angular displacement of said valve rotor with respect to said valve sleeve, a second projection extending outwardly beyond said valve sleeve and connected for rotation in unison therewith; and a substantially C-shaped spring, said spring being disposed in surrounding relationship to said valve sleeve, said first and second projections being engageable with said spring so that the resilience of said spring maintains said projections in given positions.

10. A power steering apparatus according to claim 9 in which said substantially C-shaped spring is a cylinder having a longitudinal split therein defining a gap, the end faces of said gap being disposed on opposite sides of said projections.

11. A power steering apparatus according to claim 10 in which said spring is subject to circumferential flexure in accordance with the relative angular displacement between said input shaft and said output shaft.

12. A power steering apparatus according to claim 9, claim 10 or claim 11 in which said spring is configured so that stresses produced therein are substantially uniform throughout.

13. A power steering apparatus according to claim 12 in which the wall thickness of said spring increases gradually from said gap toward a point diametrically opposite to said gap.

14. A control apparatus for a power steering device comprising an input shaft adapted to be connected at the outer end thereof to a steering wheel for rotation thereby, said input shaft having a coaxial circular shank having a smaller diameter than said input shaft and which extends from the inner end of said input shaft, said input shaft having an enlarged, substantially rectangular section adjacent said shank, said rectangular section having a first projecting member extending radially outward therefrom, said input shaft including a portion defining a valve rotor adjacent to said first projecting member;

an output shaft adapted to be connected to a steerable road wheel to effect steering movement thereof, said output shaft being coaxial with said input shaft, the inner end of said output shaft having a bushing therein with said shank of said input shaft being rotatably supported in said bushing, said inner end of said output shaft having a groove in which said rectangular section of said input shaft is received with a circumferential clearance being provided therebetween, said output shaft having a second projecting member extending radially outwardly therefrom at a position axially aligned with said first projecting member and adjacent thereto;

a valve sleeve connected with said output shaft for rotation therewith, said valve sleeve being rotatably mounted on and coaxial with said valve rotor, said valve sleeve and said valve rotor together comprising rotary valve means such that rotation of said input shaft relative to said output shaft supplies hydraulic fluid for assisting rotation of one or more steerable road wheels, said valve sleeve having a hollow projecting cylindrical inner end sleeved on the inner end of said output shaft, said cylindrical inner end of said valve sleeve having an axially extending aperture therein, said aperture having a narrow end portion of approximately the same width as the diameter of said first and second projecting members, said aperture having a portion of enlarged width at the end thereof remote from said output shaft, said projecting members projecting radially outwardly from said aperture with said first projecting member extending through the enlarged portion of said aperture and said second projecting member extending through said narrow end portion of said aperture;

a housing mounted on and coaxial with said sleeve, said housing having fluid passage means adapted to allow communication of said rotary valve means with zones located radially outwardly of said housing means;

a resilient coupling member in the form of a hollow longitudinally split cylinder defining an axially extending gap, said coupling member being disposed within said housing snugly encircling said inner end of said output shaft and the adjacent end portion of said valve sleeve, the end faces of said gap being disposed on opposite circumferential sides of and resiliently engaging said first and second projecting members, such that said first and second projecting members project through the gap in said coupling member and are held linearly by the edges defining said gap when said first and second members are in a rest position, said first projecting member extending through the enlarged portion of said aperture, said coupling member being effective to exert return force on said first and second projecting members when said first projecting member is rotated relative to said second projecting member within said enlarged portion of said aperture by rotation of said input shaft relative to said output shaft.

* * * * *